R. H. MILLER.
MIRROR SUPPORT.
APPLICATION FILED JAN. 4, 1910.
970,636.
Patented Sept. 20, 1910.
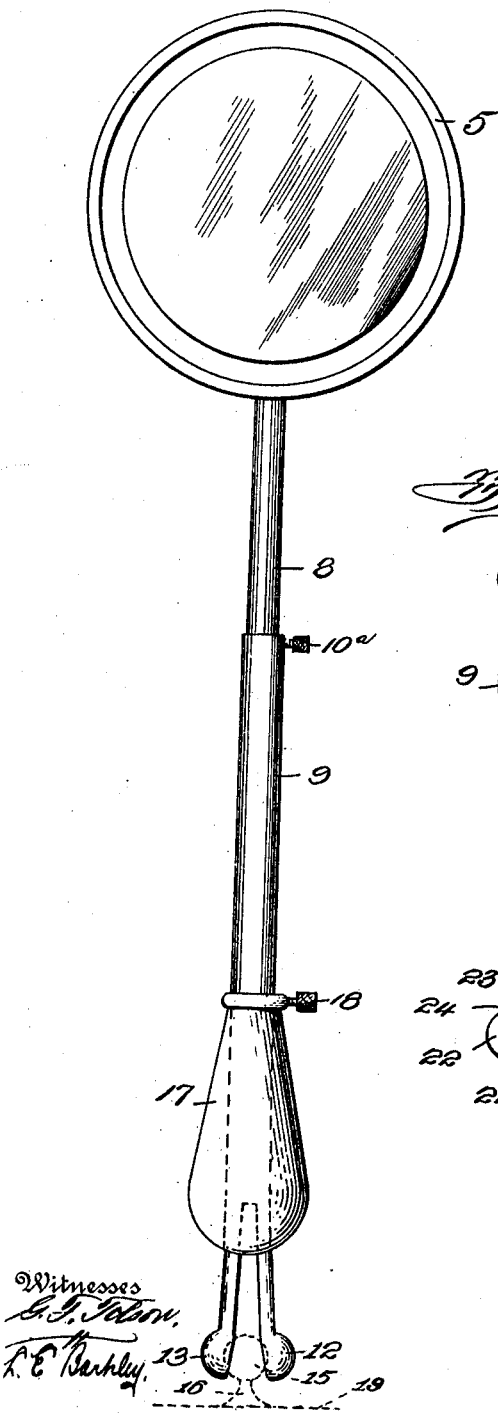
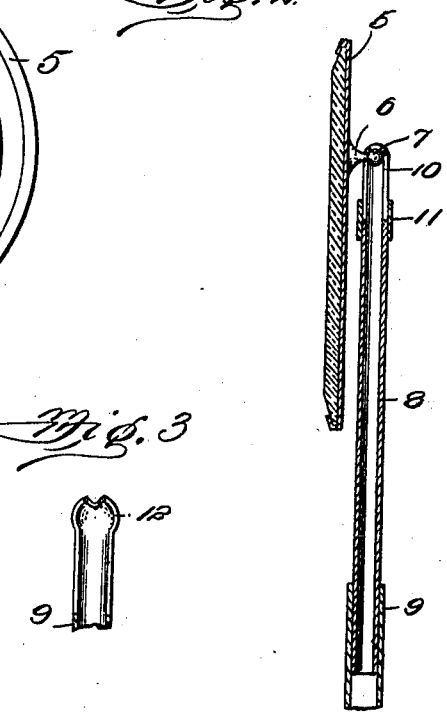
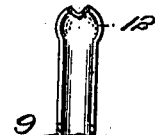
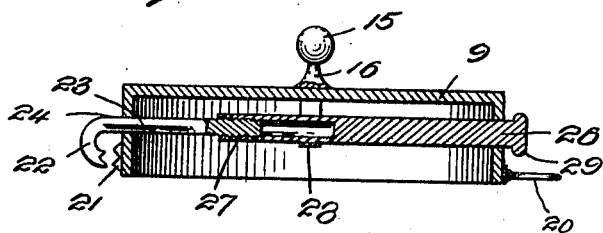
Witnesses
G. F. Folson
L. E. Barkley
Inventor
Romie H. Miller,
By Frank S. Appleman
Attorney

UNITED STATES PATENT OFFICE.

ROMIE HENRY MILLER, OF ST. LOUIS, MISSOURI.

MIRROR-SUPPORT.

970,636.  Specification of Letters Patent.  Patented Sept. 20, 1910.

Application filed January 4, 1910. Serial No. 536,344.

*To all whom it may concern:*

Be it known that I, ROMIE H. MILLER, a citizen of the United States of America, and resident of St. Louis, in the State of Missouri, have invented certain new and useful Improvements in Mirror-Supports, of which the following is a specification.

This invention relates to furniture and particularly to brackets designed to hold mirrors or the like.

An object of this invention is to provide a bracket having means for attaching a mirror thereto, novel means being also provided for coupling the bracket to a gas fixture or other like fixture employed in houses or apartments.

A further object of this invention is to provide a mirror having a handle or stem formed in telescopically arranged sections for the purpose of permitting an adjustment of the stem, the said stem being also provided with novel means for connecting its outer end to a support such as has been referred to heretofore.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, illustrates a view in elevation of a mirror with a stem and handle applied thereto; Fig. 2 illustrates a vertical sectional view of the mirror and a fragment of the stem; Fig. 3 illustrates a detail view of one end of the stem; and Fig. 4 illustrates a sectional detail of a bracket to which the stem may be connected.

In these drawings 5, denotes a mirror having a back provided with a stud 6, terminating in a ball 7.

The stem is shown as being formed of sections 8 and 9, the latter of which is slidable over the former and the said section 9 is also provided with a set screw 10 by which the two sections of the stem are held at different positions of adjustment. The section 8 has its end split or bifurcated to form a socket 10 for the ball 7 and the said section 8 is further provided with a sleeve 11 which is capable of being moved longitudinally of the said section for the purpose of clamping the bifurcated ends of the said section into engagement with the ball 7 thereby forming a ball and socket joint between the stem and the mirror which will permit the said mirror to be adjusted at different angles with relation to the stem. By manipulating the sleeve, it will be observed that the bifurcated end of the section 8 may be held in such engagement with the ball 7 as to frictionally retain the parts in adjusted positions.

The section 9 of the stem has its end bifurcated and enlarged to form the sockets 12 and 13 which are designed to receive the ball 15 of the stud 16 which stud 16 is carried by a bracket to be secured to a lighting fixture or other support. The section 9 of the stem is provided with a sleeve 17 which is slidable on the section, the said sleeve being flared toward its outer end to form a handle when the mirror is to be employed as a hand glass and the said sleeve furthermore performs the function of clamping the ends of the section 9, in engagement with the ball 15 when the stem is to be applied to the bracket. The sleeve 17 is provided with a set screw 18 which is designed to bear against the section 9 of the stem for the purpose of retaining the sleeve 17 in different positions of adjustment.

The device shown in Fig. 4 is constructed for an attachment to a lighting fixture or other support and comprises the body 19 which carries the stud 16 and the said body may be provided with a ring 20 by which the bracket may be suspended, this ring forming one of the means for retaining the bracket and the mirror which may be coupled thereto through the medium of the stem heretofore described in position for use. Another means for suspending the bracket and one which may be employed in connection with lighting fixtures and the like consists of the lugs 21 formed on the outer surface of the body 19 which is designed to coact with a clamping jaw 22 which has a stem 23 slidable in an aperture 24 in one wall of the body 19. A wall of the body is also provided with an aperture 25 in which a rod 26 is rotatable, the said rod having its inner end recessed and the wall of said recess threaded to engage the threaded portion 27 of the stem 23. The rod 26 is supported by a handle 28 having its end anchored to the interior wall of the body in any suitable manner. By an inspection of Fig. 4, it will be apparent that partial rotation of the rod 26 will result in moving the clamping jaw 22 with relation to the lug 21 thereby moving the said clamping jaw into or out of engagement with a support for the bracket. The stem 23 of the jaw is preferably rectangular in cross section and the aperture 24 is preferably of the same configuration as the said stem, for by this relation of parts the stem is prevented from rotating when the rod 26 is manipulated. The head 29 of the rod will bear against the outer surface of the body 19 when the jaw is in clamping engagement with a support and the said rod is slidable in the aperture to a limited extent for the purpose of expediting the application of the bracket to a fixture, it being understood that the said rod will be prevented from dislodging from the body by reason of its head 29 limiting the movement in one direction and the jaw 22 limiting the movement in the opposite direction.

While I have described the device shown in Fig. 4 as being designed for use as an attachment to a fixture for supporting the glass, the said member 19 will also serve as a base for supporting the same when the mirror is used as a stand glass.

I claim—

1. In a mirror support, a mirror having a stud and a ball on the end thereof, a stem comprising telescopic sections one end of said stem being connected to the ball, sockets on the opposite end of the stem, a combined handle and socket retaining device on the stem, means for holding the stem at different positions of adjustment, a bracket having a body provided with a stud, a ball adapted to coact with the sockets of the stem, a rod slidable in the bracket, a stem threaded in the rod, a jaw on the stem, and a coacting device on the body with relation to which the jaw operates for securing the bracket to a fixture.

2. In a mirror support, a mirror having a stud and a ball on the end thereof, a stem comprising telescopic sections one end of said stem being connected to the ball, sockets on the opposite end of the stem, a combined handle and socket retaining device on the stem, means for holding the stem at different positions of adjustment, a bracket having a body provided with a stud, a ball adapted to coact with the sockets of the stem, a rod having a bearing in the body wherein it is slidable and rotatable, the said rod being provided with a screw threaded opening, a stem for engaging said threads, means for preventing rotation of the stem, a jaw on the stem, and means on the body with which the jaw coacts to retain the bracket on a fixture.

In testimony whereof I affix my signature in the presence of two witnesses.

ROMIE HENRY MILLER.

Witnesses:
 M. E. TENNANT,
 D. F. McCARTHY.